US012444887B2

(12) United States Patent
Mitsui et al.

(10) Patent No.: US 12,444,887 B2
(45) Date of Patent: Oct. 14, 2025

(54) SHIELDED TERMINAL AND SHIELDED CONNECTOR

(71) Applicant: SUMITOMO WIRING SYSTEMS, LTD., Mie (JP)

(72) Inventors: Shohei Mitsui, Mie (JP); Norihito Hashimoto, Mie (JP); Motoki Kubota, Mie (JP); Keisuke Kanemura, Mie (JP); Wataru Yamanaka, Mie (JP); Yusuke Ito, Mie (JP); Kazuya Kobayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 314 days.

(21) Appl. No.: 17/915,285

(22) PCT Filed: Mar. 9, 2021

(86) PCT No.: PCT/JP2021/009109
§ 371 (c)(1),
(2) Date: Sep. 28, 2022

(87) PCT Pub. No.: WO2021/199945
PCT Pub. Date: Oct. 7, 2021

(65) Prior Publication Data

US 2023/0129292 A1 Apr. 27, 2023

(30) Foreign Application Priority Data

Mar. 30, 2020 (JP) ................................. 2020-059375

(51) Int. Cl.
*H01R 13/6581* (2011.01)
*H01R 13/6592* (2011.01)
*H01R 24/38* (2011.01)

(52) U.S. Cl.
CPC ..... *H01R 13/6581* (2013.01); *H01R 13/6592* (2013.01); *H01R 24/38* (2013.01)

(58) Field of Classification Search
CPC . H01R 13/6581; H01R 13/6592; H01R 24/38
(Continued)

(56) References Cited

U.S. PATENT DOCUMENTS 3,302,159 A 1/1967 Schumacher
6,065,998 A * 5/2000 Peloza ................ H01R 9/0518 439/578

(Continued)

FOREIGN PATENT DOCUMENTS

CN 100421304 C * 9/2008 ........... H01R 13/658
EP 1050932 A2 * 11/2000 ........... H01R 9/0518

(Continued)

OTHER PUBLICATIONS

International Search Report issued on May 11, 2021 for WO 2021/199945 A1 (4 pages).

*Primary Examiner* — Peter G Leigh
(74) *Attorney, Agent, or Firm* — Venjuris, P.C.

(57) ABSTRACT

Provided are a shielded terminal and a shielded connector that can prevent a short circuit between a connection portion for an electric component and an outer conductor. A shielded terminal includes an outer conductor, a connection portion for an electric component, and an insulator, wherein the outer conductor has a crimping portion that is crimped onto an end portion of a shielded wire, a bottom surface portion in which an opening is formed forward of the crimping portion, and side surface portions provided on both the left and right sides of the bottom surface portion, the connection portion is disposed between the left and right side surface portions and formed by connecting a center conductor of the shielded wire and the electric component to each other, and the insulator has left and right side walls that are located (Continued)

between the connection portion and the respective side surface portions.

5 Claims, 11 Drawing Sheets

(58) Field of Classification Search
USPC .................................................... 439/607.5
See application file for complete search history.

(56) References Cited

U.S. PATENT DOCUMENTS

| | | | | |
|---|---|---|---|---|
| 6,200,162 | B1 | 3/2001 | Aoyama et al. | |
| 6,206,727 | B1 | 3/2001 | Aoyama et al. | |
| 6,210,223 | B1 | 4/2001 | Aoyama et al. | |
| 6,746,268 | B2 * | 6/2004 | Laub ..................... | H01R 9/053 439/394 |
| 2003/0104720 | A1 * | 6/2003 | Laub ..................... | H01R 9/053 439/394 |
| 2006/0086526 | A1 | 4/2006 | Kawamura | |
| 2006/0228941 | A1 | 10/2006 | Abe et al. | |
| 2009/0280688 | A1 | 11/2009 | Kawada et al. | |
| 2013/0344737 | A1 * | 12/2013 | Kanda .................. | H01R 9/0518 439/607.5 |
| 2015/0064992 | A1 * | 3/2015 | Kato ........................ | H01R 4/20 439/879 |
| 2019/0199008 | A1 | 6/2019 | Kanemura et al. | |
| 2019/0386439 | A1 | 12/2019 | Kameyama et al. | |

FOREIGN PATENT DOCUMENTS

| | | | | | |
|---|---|---|---|---|---|
| EP | 1291981 | A2 | * | 3/2003 | ............. H01R 24/44 |
| JP | 2002198132 | A | * | 7/2002 | |
| JP | 2002208457 | A | * | 7/2002 | |
| JP | 2002334764 | A | * | 11/2002 | |
| JP | 3365549 | B2 | * | 1/2003 | ............. H01R 4/184 |
| JP | 3365550 | B2 | * | 1/2003 | ........... H01R 9/0518 |
| JP | 2018-032550 | A | | 3/2018 | |
| JP | 2018-055772 | A | | 4/2018 | |

* cited by examiner

SHIELDED TERMINAL AND SHIELDED CONNECTOR

CROSS REFERENCE TO RELATED APPLICATIONS

This application is a national phase of PCT application No. PCT/JP2021/009109, filed on 9 Mar. 2021, which claims priority from Japanese patent application No. 2020-059375, filed on 30 Mar. 2020, all of which are incorporated herein by reference.

TECHNICAL FIELD

The present disclosure relates to a shielded terminal and a shielded connector.

BACKGROUND

As disclosed in, for example, Patent Documents 1 to 4 below, shielded terminals to be connected to end portions of shielded wires are conventionally known. A shielded wire has a center conductor, a coating, a shielding layer, and a sheath. The coating has insulating properties and surrounds the outer circumference of the center conductor. The shielding layer surrounds the outer circumference of the coating. The sheath surrounds the outer circumference of the shielding layer. A shielded terminal has an inner conductor to be connected to the center conductor and an outer conductor to be connected to the shielding layer. The inner conductor is accommodated in a dielectric. The dielectric is held inside the outer conductor.

PRIOR ART DOCUMENT

Patent Document

Patent Document 1: JP 2000-164263 A
Patent Document 2: JP 2018-032550 A
Patent Document 3: JP 2018-055772 A
Patent Document 4: JP 2019-114489 A

SUMMARY OF THE INVENTION

Problems to be Solved

With regard to a shielded terminal such as that described above, it is demanded that, when an electric component is built in the shielded terminal, a short circuit between a connection portion for the electric component and the outer conductor be prevented.

Therefore, an object of the present disclosure is to provide a shielded terminal and a shielded connector that can prevent a short circuit between the connection portion for the electric component and the outer conductor.

Means to Solve the Problem

A shielded terminal of the present disclosure includes an outer conductor, a connection portion for an electric component, and an insulator, wherein the outer conductor has a crimping portion that is crimped onto an end portion of a shielded wire, a bottom surface portion in which an opening is formed forward of the crimping portion, and side surface portions provided on both the left and right sides of the bottom surface portion, the connection portion for the electric component is disposed between the left and right side surface portions and formed by connecting a center conductor of the shielded wire and the electric component to each other, and the insulator has left and right side walls that are located between the connection portion for the electric component and the respective side surface portions.

Effect of the Invention

According to the present disclosure, it is possible to provide a shielded terminal and a shielded connector that can prevent a short circuit between a connection portion for an electric component and an outer conductor.

DETAILED DESCRIPTION TO EXECUTE THE INVENTION

Description of Embodiment of Disclosure

Figure 1:
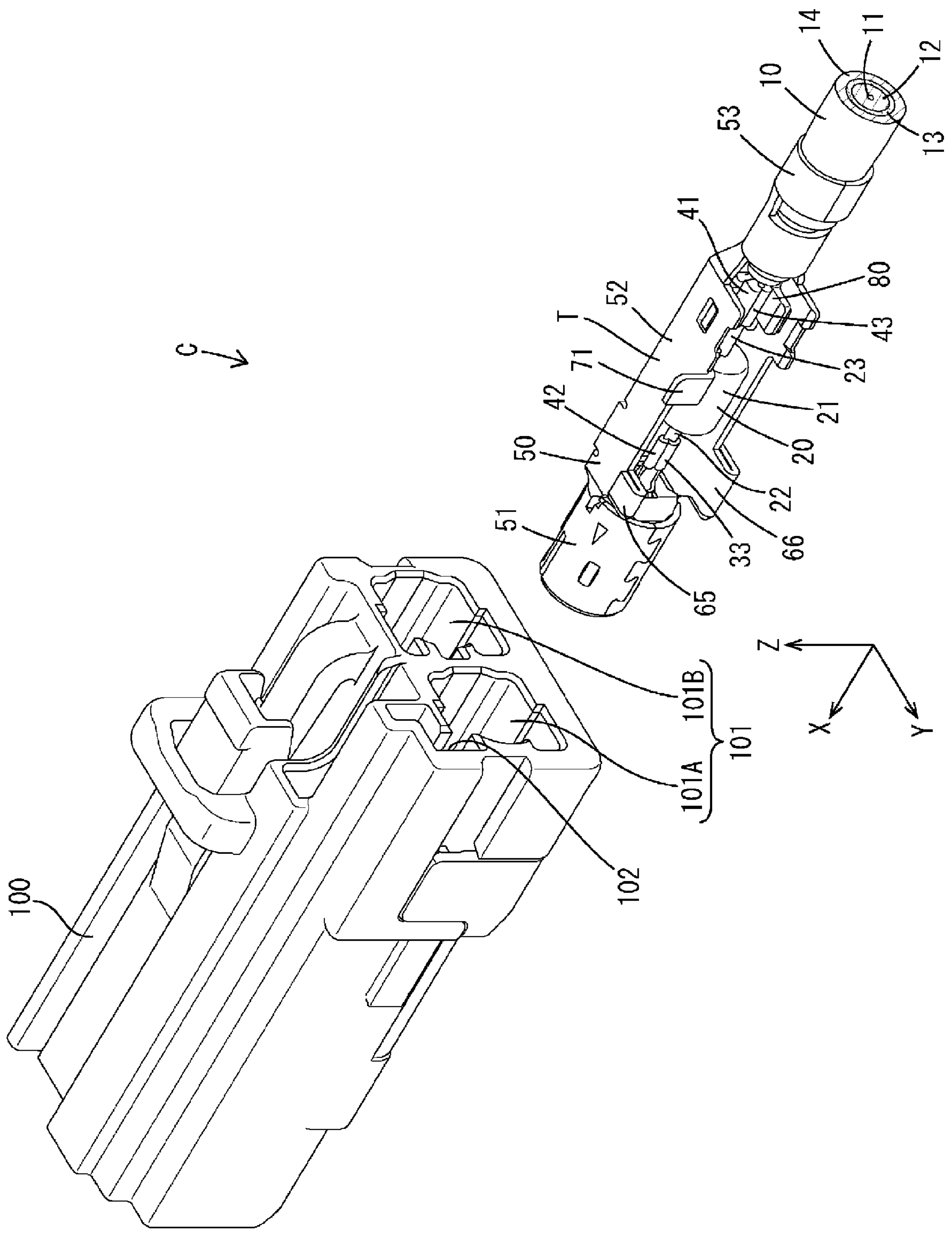
FIG. 1 is a perspective view showing a shielded terminal and a housing according to an embodiment.

Initially, modes for carrying out the present disclosure will be enumerated and described.

A shielded terminal of the present disclosure is as follows.

(1) The shielded terminal includes an outer conductor, a connection portion for an electric component, and an insulator, wherein the outer conductor has a crimping portion that is crimped onto an end portion of a shielded wire, a bottom surface portion in which an opening is formed forward of the crimping portion, and side surface portions provided on both left and right sides of the bottom surface portion, the connection portion for the electric component is disposed between the left and right side surface portions and formed by connecting a center conductor of the shielded wire and the electric component to each other, and the insulator has left and right side walls that are located between the connection portion for the electric component and the respective side surface portions. With this configuration, the connection portion for the electric component and the outer conductor are insulated from each other by the insulator, and thus, a short circuit between the connection portion for the electric component and the outer conductor can be prevented.

(2) It is preferable that the insulator has a bottom wall that fits into the opening. With this configuration, the opening is closed by the bottom wall of the insulator. There is a problem in that, when the bottom wall of the outer conductor has an opening, the characteristic impedance is high. However, since the opening of the outer conductor is closed by the bottom wall of the insulator, the characteristic impedance of the entire shielded terminal can be improved.

(3) It is preferable that the side walls have locking portions that are locked to the respective side surface portions. The reason for this is that, with this configuration, the insulator can be easily installed in its placement portion by the side walls of the insulator being locked to the respective side surface portions.

(4) It is preferable that the outer conductor has a tube portion located forward of the bottom surface portion, the shielded terminal further includes: an inner conductor accommodated in the tube portion via a dielectric; and a second connection portion for the electric component, the second connection portion being disposed between the left and right side surface portions and formed by connecting the inner conductor and the electric component to each other, and a second opening is formed at a position corresponding to the second connection portion for the electric component in the bottom surface portion. The reason for this is that, with this configuration, in a state in which the inner conductor is set in the outer conductor, a tool for connecting the inner conductor and the electric component to each other can be inserted into the second opening, and the inner conductor and the electric component can be easily connected to each other.

A shielded connector of the present disclosure is as follows.

(1) The shielded connector includes the above-described shielded terminal and a housing having a terminal accommodation chamber in which the shielded terminal is accommodated. With this configuration, the connection portion for the electric component and the outer conductor are insulated from each other by the insulator, and thus, a short circuit between the connection portion for the electric component and the outer conductor can be prevented.

DETAILED DESCRIPTION OF EMBODIMENT OF DISCLOSURE

Hereinafter, specific examples of a shielded connector C of the present disclosure will be described with reference to the drawings. Note that the present disclosure is not limited to these illustrative examples and is defined by the claims, and all changes that come within the meaning and range of equivalency of the claims are intended to be embraced therein.

As shown in FIG. 1, the shielded connector C includes a shielded terminal T and a housing 100. The shielded terminal T is connected to an end portion of a shielded wire 10. An electric component 20 is built in the shielded terminal T.

In the following description, for each constituent member, the positive side of the X-axis in FIG. 1 (a side to be connected to a mating connector, which is not shown) is referred to as the front side, the negative side of the X-axis in FIG. 1 as the rear side, the positive side of the Y-axis in FIG. 1 as the upper side, the negative side of the Y-axis in FIG. 1 as the lower side, the positive side of the Z-axis in FIG. 1 as the right side, and the negative side of the Z-axis in FIG. 1 as the left side.

The shielded wire 10 is a coaxial cable. As shown in FIG. 1, the shielded wire 10 has a center conductor 11, a coating 12, a shielding layer 13, and a sheath 14. The center conductor 11 is a conductor that transmits high-frequency signals. The coating 12 is made of a resin and has insulating properties. The coating 12 surrounds an outer circumference of the center conductor 11. The shielding layer 13 is, for example, a braided wire constituted by thin metal wires that are braided into a mesh. The shielding layer 13 surrounds an outer circumference of the coating 12. The sheath 14 surrounds an outer circumference of the shielding layer 13.

Figure 2:
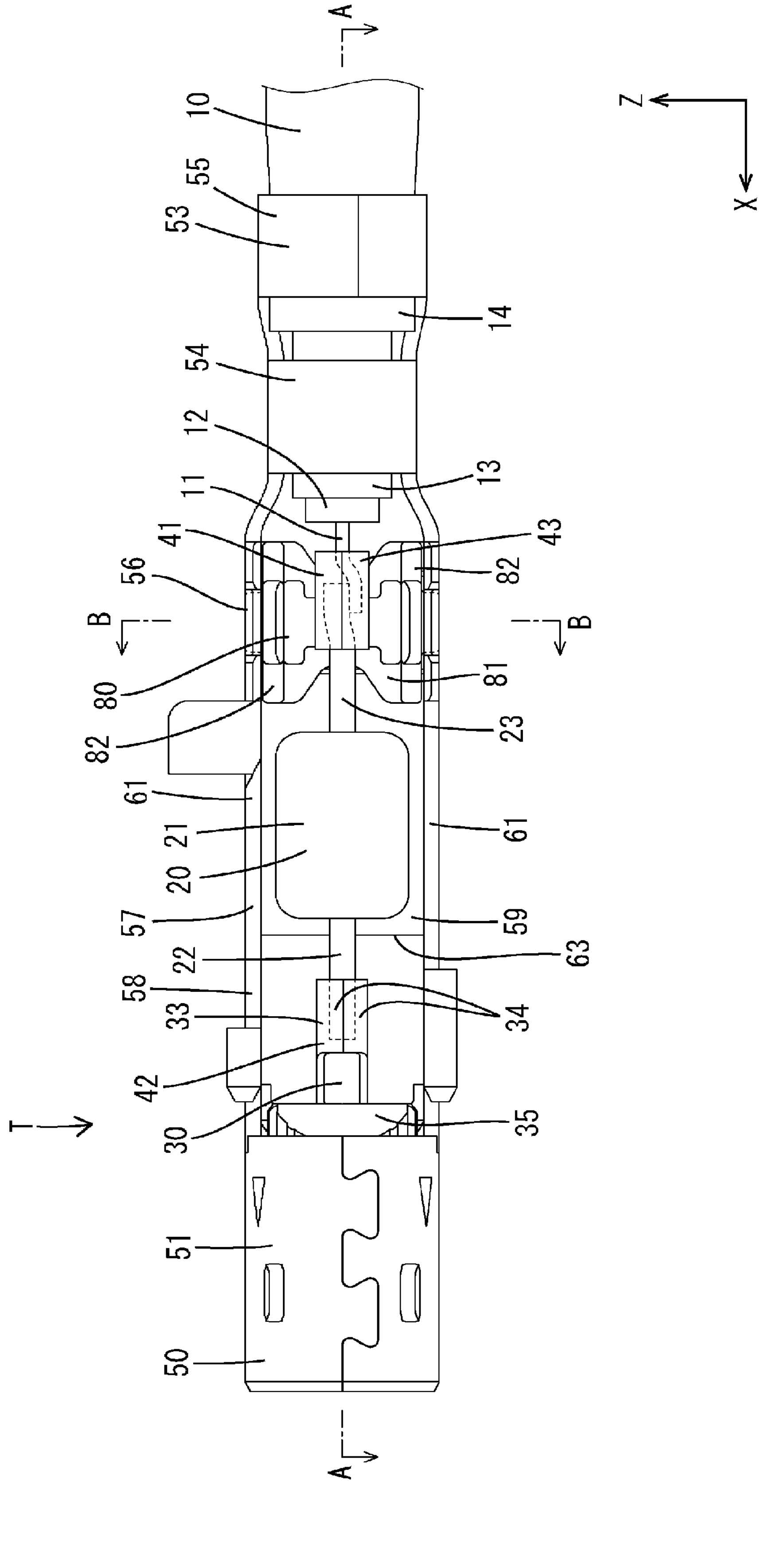
FIG. 2 is a plan view showing the shielded terminal.

As shown in FIG. 2, the shielded terminal T includes the electric component 20, an inner conductor 30, a dielectric 35, connection portions (referred to as "first connection portion 41" and "second connection portion 42", respectively) for the electric component 20, an outer conductor 50, and an insulator 80.

The electric component 20 adjusts electric characteristics of the shielded terminal T. The electric component 20 is, for example, a leaded capacitor that adjusts capacitance. The electric component 20 has a component main body 21, an inner conductor connection portion 22, and a center conductor connection portion 23.

The component main body 21 has a circular column-like shape. The inner conductor connection portion 22 is in the form of a lead wire. The inner conductor connection portion 22 extends forward from a front surface of the component main body 21. The inner conductor connection portion 22 is connected to the inner conductor 30. The center conductor connection portion 23 is in the form of a lead wire. The center conductor connection portion 23 extends rearward from a rear surface of the component main body 21. The center conductor connection portion 23 is connected to the center conductor 11 of the shielded wire 10.

Figure 3:
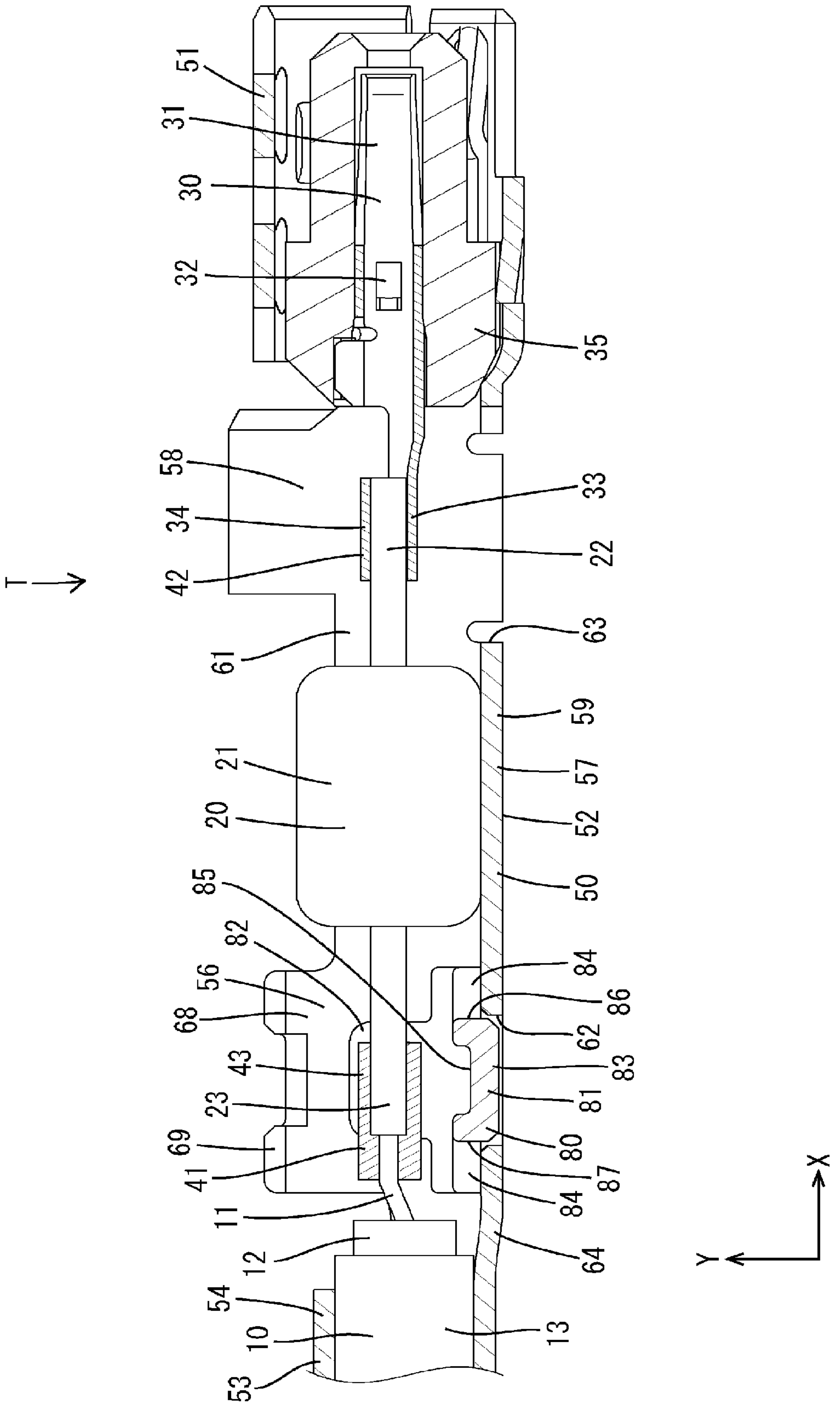
FIG. 3 is a cross-sectional view showing the shielded terminal and corresponding to a cross section at position A-A in FIG. 2.

The inner conductor 30 is integrally formed by, for example, bending a conductive metal plate. As shown in FIG. 3, the inner conductor 30 has a mating terminal connection portion 31 and an electric component connection portion 33. The mating terminal connection portion 31 is connected to a mating inner conductor terminal, which is not shown. The mating terminal connection portion 31 is provided with a pair of left and right locking projections 32 (only one of which is shown in FIG. 3) that can be locked to the dielectric 35. The electric component connection portion 33 is connected to the inner conductor connection portion 22 of the electric component 20. The electric component connection portion 33 has a pair of left and right crimping pieces 34 extending upward from a bottom wall portion (see FIG. 4).

The dielectric 35 is made of a synthetic resin. The inner conductor 30 is accommodated in the dielectric 35.

As shown in FIG. 3, the first connection portion 41 is formed by connecting the center conductor 11 of the shielded wire 10 and the center conductor connection portion 23 of the electric component 20 to each other. The center conductor 11 of the shielded wire 10 and the center conductor connection portion 23 of the electric component 20 are connected to each other by a crimping member 43. The crimping member 43 has an open barrel shape. The crimping member 43 connects the center conductor connection portion 23 of the electric component 20 and the center conductor 11 of the shielded wire 10 to each other by crimping them together (see FIG. 9).

As shown in FIG. 3, the second connection portion 42 is formed by connecting the electric component connection portion 33 of the inner conductor 30 and the inner conductor connection portion 22 of the electric component 20 to each other. The electric component connection portion 33 of the inner conductor 30 and the inner conductor connection portion 22 of the electric component 20 are crimped together by the left and right crimping pieces 34 of the electric component connection portion 33 being wrapped around an outer circumference of the inner conductor connection portion 22 of the electric component 20.

Figure 4:
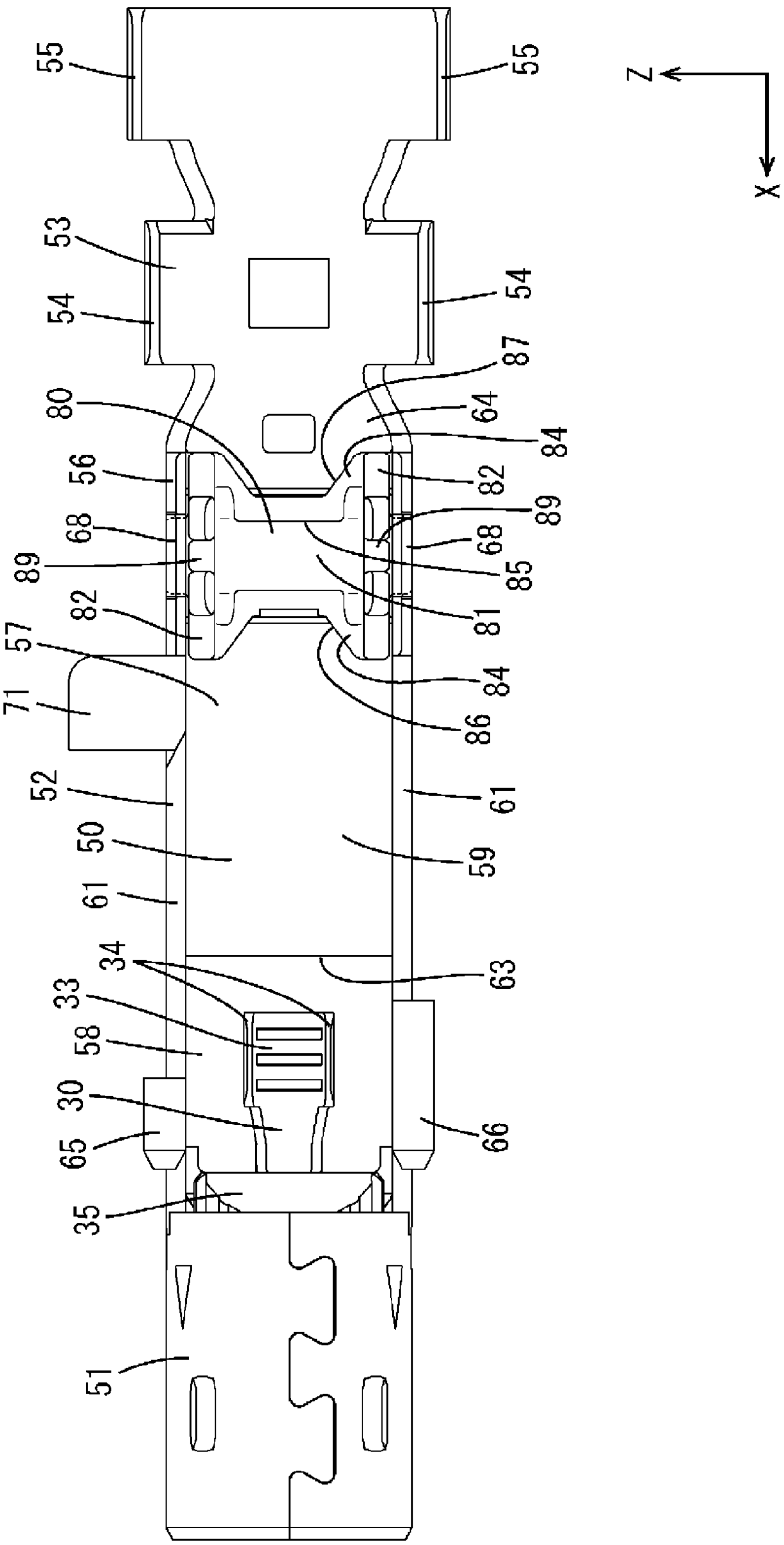
FIG. 4 is a plan view showing an outer conductor in which an inner conductor, a dielectric, and an insulator are provided.
Figure 5:
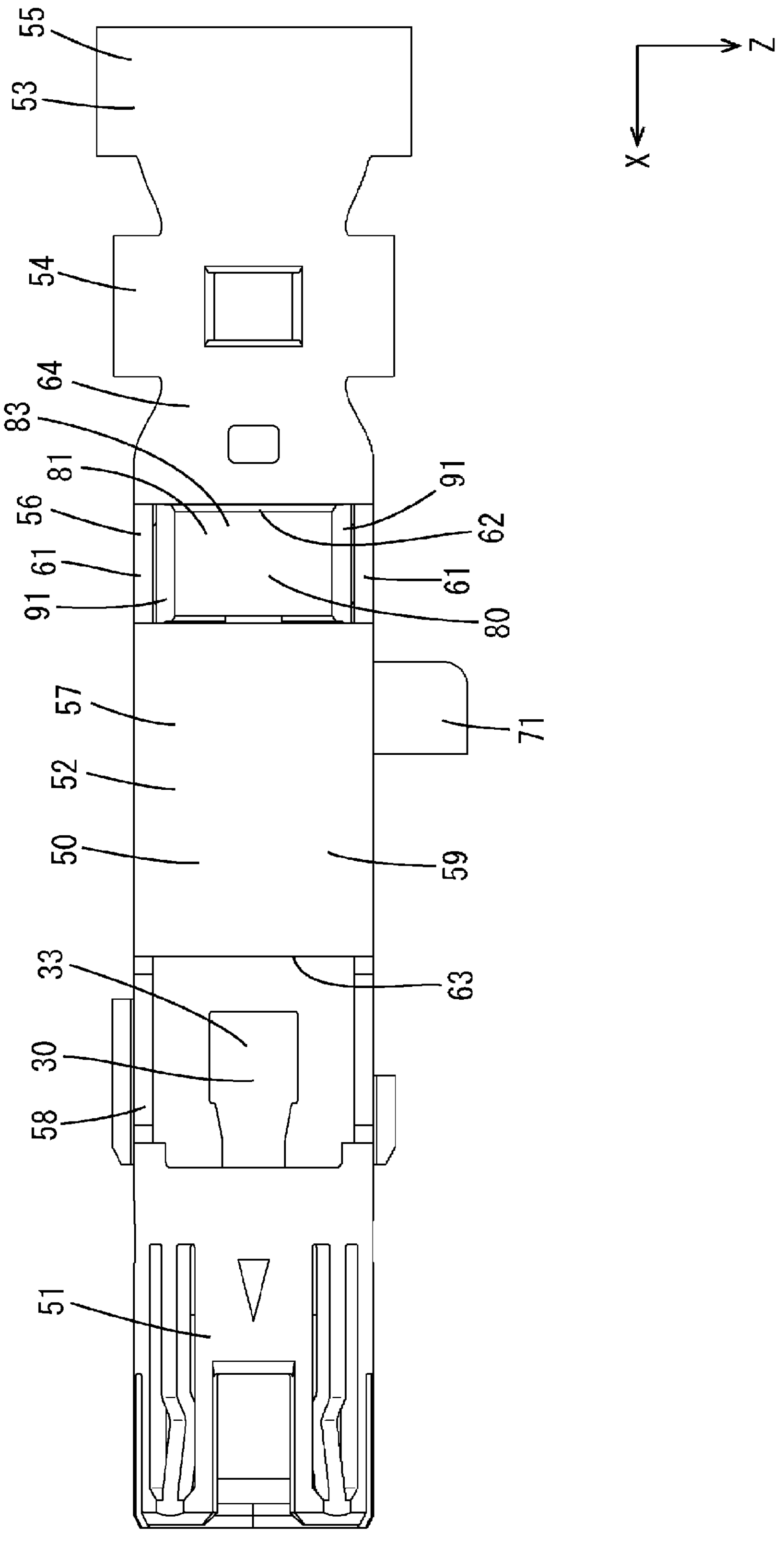
FIG. 5 is a bottom view showing the outer conductor in which the inner conductor, the dielectric, and the insulator are provided.

The outer conductor 50 is integrally formed by, for example, bending a conductive metal plate. As shown in FIGS. 4 and 5, the outer conductor 50 has a tube portion 51, an electric component placement portion 52, and a crimping portion 53. The tube portion 51 is provided at a front end portion of the outer conductor 50. The tube portion 51 has a cylindrical shape. The dielectric 35 is accommodated in the tube portion 51 by being inserted therein from the rear side.

Figure 6:
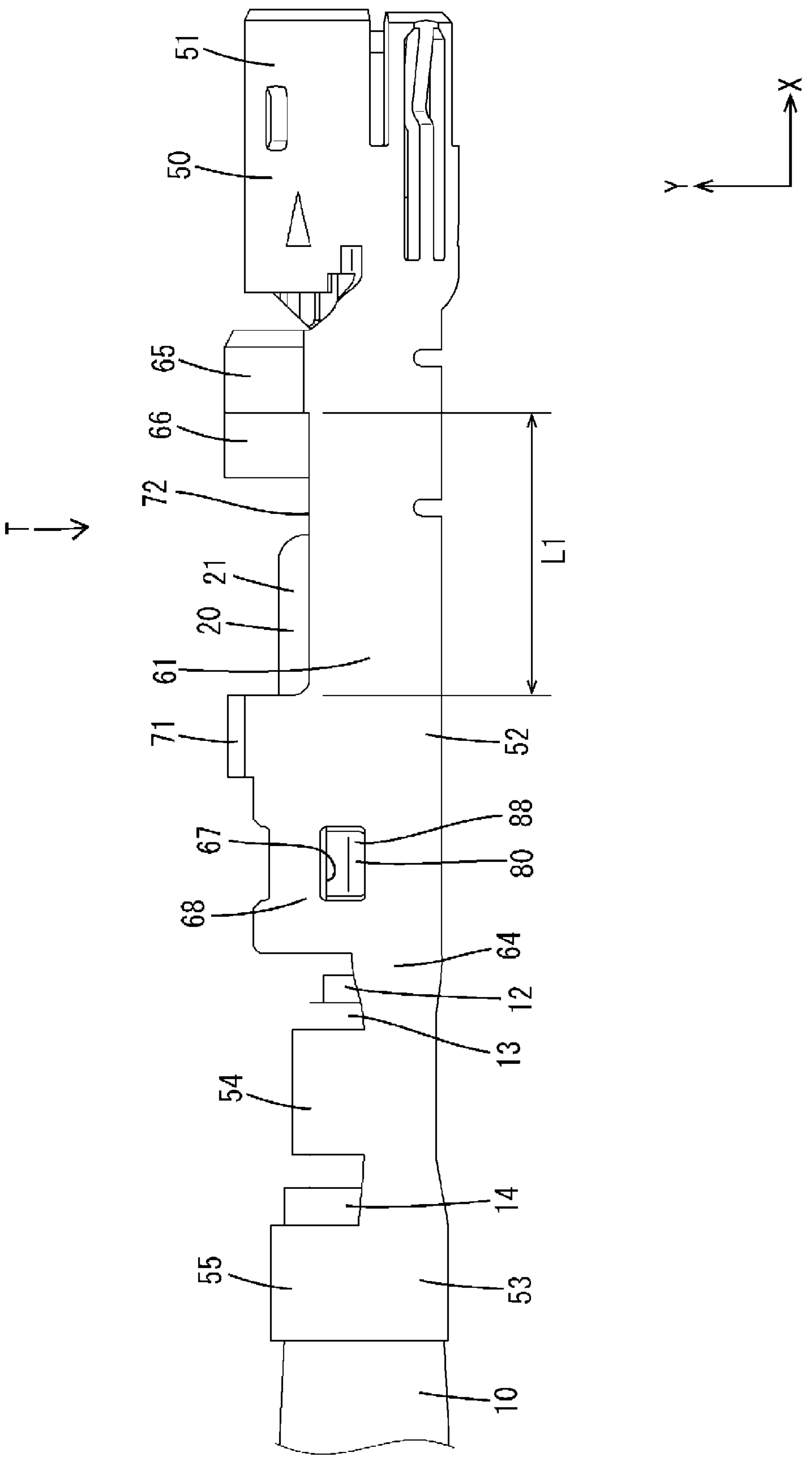
FIG. 6 is a side view showing the shielded terminal.

The crimping portion 53 is provided at a rear end portion of the outer conductor 50. As shown in FIG. 6, the crimping portion 53 is crimped onto the end portion of the shielded wire 10. The crimping portion 53 has a pair of left and right wire barrel pieces 54 and a pair of left and right insulation barrel pieces 55. The pair of left and right wire barrel pieces 54 are wrapped around the outer circumference of the shielding layer 13 of the shielded wire 10. The pair of left and right insulation barrel pieces 55 are wrapped around the outer circumference of the sheath 14 of the shielded wire 10.

As shown in FIG. 2, the electric component placement portion 52 has a first placement portion 56, a main body placement portion 57, and a second placement portion 58. The first connection portion 41 is placed in the first placement portion 56. The first placement portion 56 is provided at a rear end portion of the electric component placement portion 52. The component main body 21 of the electric component 20 is placed in the main body placement portion 57. The main body placement portion 57 is provided at a central portion of the electric component placement portion 52 in the front-rear direction. The second connection portion 42 is placed in the second placement portion 58. The second placement portion 58 is provided at a front end portion of the electric component placement portion 52.

As shown in FIGS. 4 and 5, the electric component placement portion 52 has a bottom surface portion 59 and side surface portions 61. The rear end portion of the electric component placement portion 52 constitutes a connecting portion 64 to the crimping portion 53. In the connecting portion 64, the length of the bottom surface portion 59 in the left-right direction gradually decreases rearward. In the connecting portion 64, the length of the side surface portions 61 in the up-down direction gradually decreases rearward (see FIG. 6).

As shown in FIGS. 4 and 5, the bottom surface portion 59 has a first opening (referred to as "first opening 62") and a second opening (referred to as "second opening 63"). The first opening 62 and the second opening 63 penetrate the bottom surface portion 59 in the up-down direction.

As shown in FIG. 5, the first opening 62 is provided in the first placement portion 56. The first opening 62 is located forward of the crimping portion 53. The first opening 62 is provided at a rear end portion of the bottom surface portion 59. The first opening 62 has a rectangular shape elongated in the left-right direction. The first opening 62 is open over the entire length of the bottom surface portion 59 in the left-right direction.

As shown in FIG. 5, the second opening 63 is provided in the second placement portion 58. The second opening 63 is provided at a front end portion of the bottom surface portion 59. The second opening 63 exposes the electric component connection portion 33 of the inner conductor 30 to below the bottom surface portion 59. The length of the second opening 63 in the front-rear direction is larger than the length of the first opening 62 in the front-rear direction. The second opening 63 is a jig hole. A crimping die (anvil), which is not shown, with which the operation for connecting the electric component connection portion 33 of the inner conductor 30 and the inner conductor connection portion 22 of the electric component 20 to each other is performed can enter the second opening 63.

As shown in FIG. 4, the side surface portions 61 are provided on both the left and right sides of the bottom surface portion 59. Front ends of the side surface portions 61 are connected to a rear end of the tube portion 51. Rear ends of the side surface portions 61 are connected to a front end of the crimping portion 53.

Figure 7:
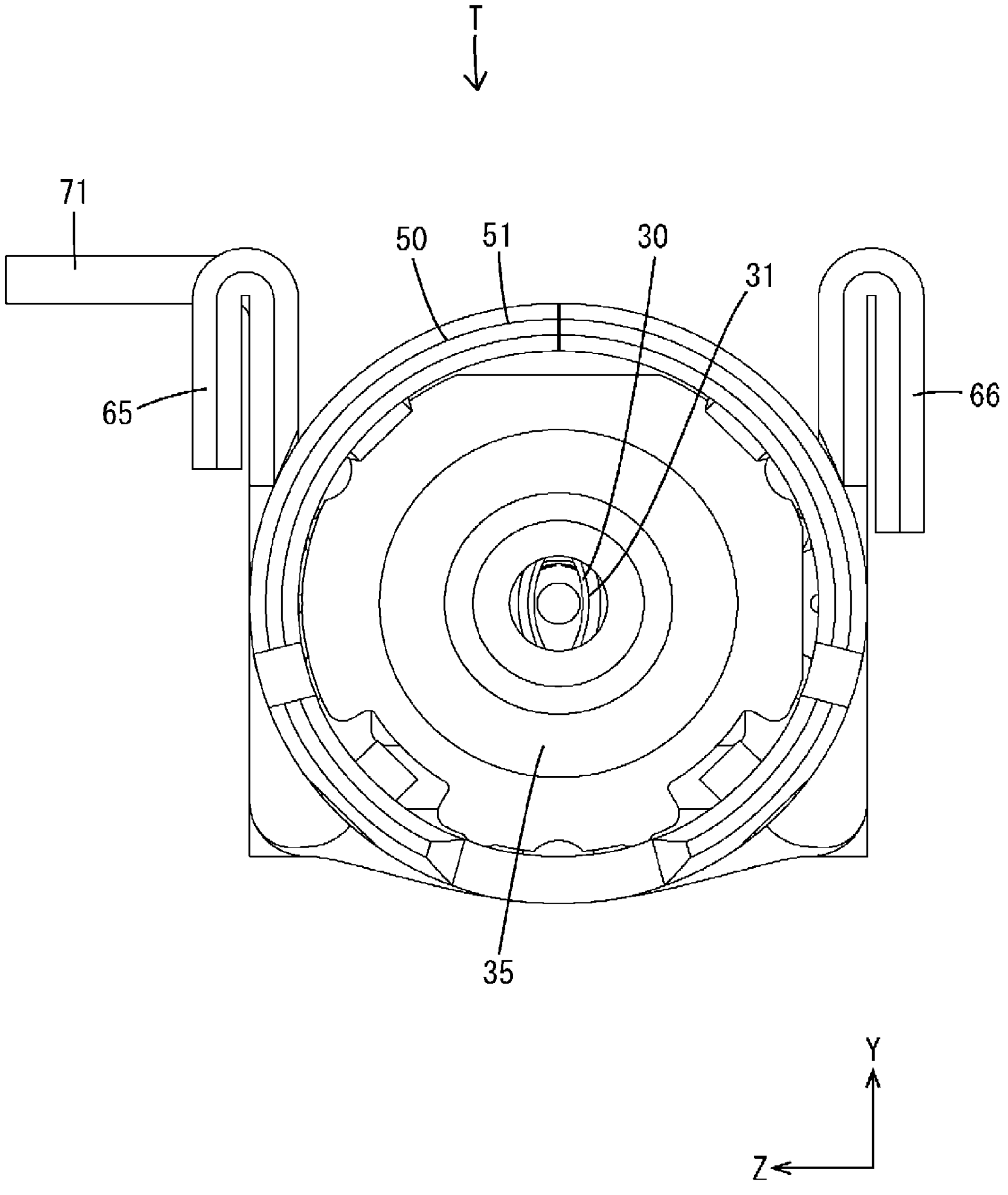
FIG. 7 is a front view showing the shielded terminal.

As shown in FIG. 4, the side surface portions 61 have a first stabilizer 65 and a second stabilizer 66, respectively. The first stabilizer 65 and the second stabilizer 66 are provided at front end portions of the respective side surface portions 61. As shown in FIG. 7, the first stabilizer 65 and the second stabilizer 66 protrude upward from upper ends of the respective side surface portions 61. The first stabilizer 65 and the second stabilizer 66 protrude upward from the upper ends of the respective side surface portions 61 and are then folded downward at their protruding ends, and thus each have a double-walled shape.

Figure 8:
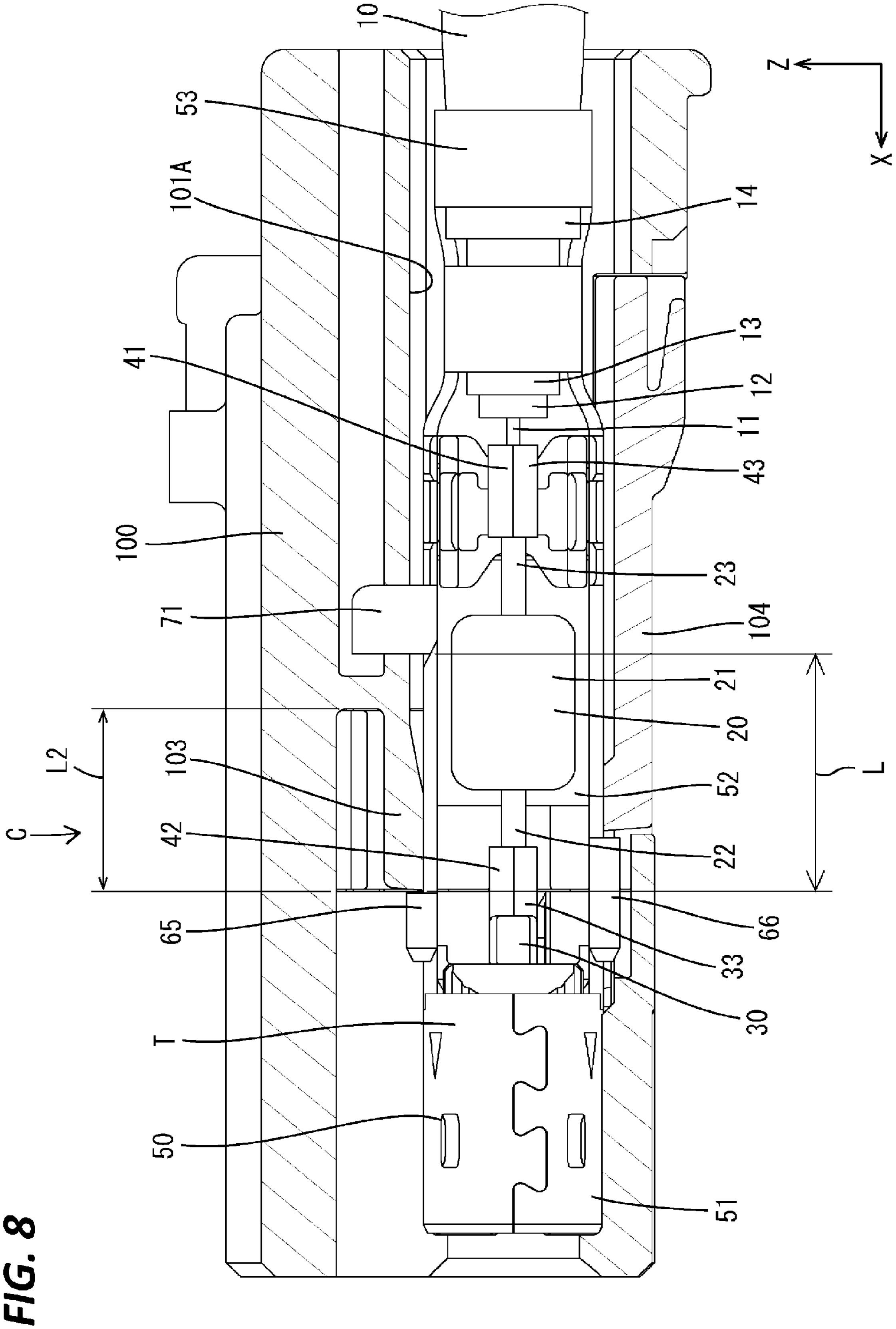
FIG. 8 is a cross-sectional view showing a shielded connector in a state in which a lance and a retainer are locked to the shielded terminal.

As shown in FIG. 8, the first stabilizer 65 is locked to a lance 103 provided in the housing 100. The first stabilizer 65 is provided on the right side surface portion 61. The second stabilizer 66 is locked to a retainer 104 provided in the housing 100. The second stabilizer 66 is provided on the left side surface portion 61. The length of the second stabilizer 66 in the front-rear direction is larger than the length of the first stabilizer 65 in the front-rear direction. A rear end of the second stabilizer 66 is located rearward of a rear end of the first stabilizer 65.

Figure 9:
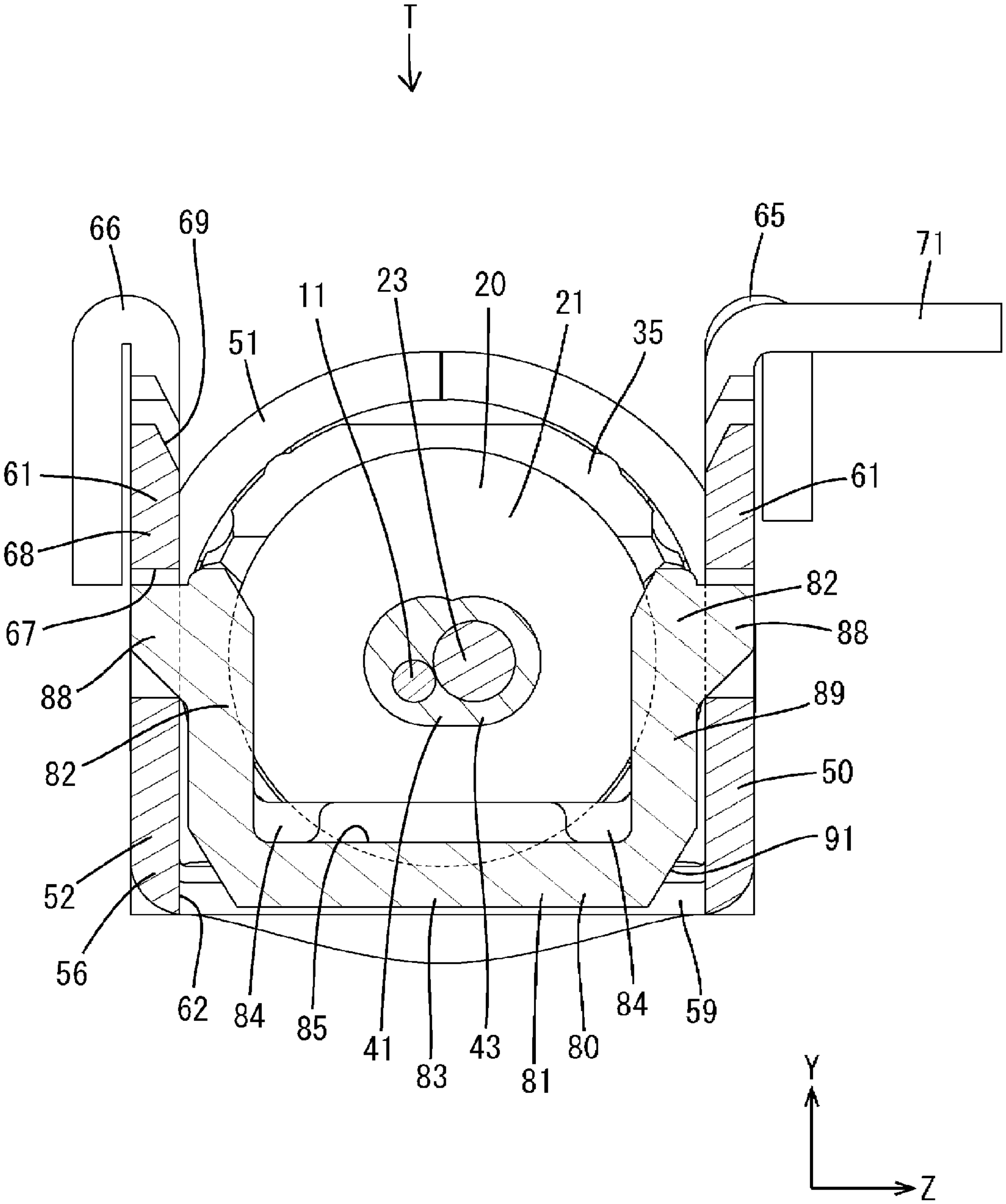
FIG. 9 is a cross-sectional view showing the shielded terminal and corresponding to a cross section at position B-B in FIG. 2.

As shown in FIG. 9, the side surface portions 61 are provided with locking receiving portions 67 to which the insulator 80 is locked. The locking receiving portions 67 are formed in locking receiving walls 68 provided in the respective side surface portions 61. As shown in FIG. 3, the locking receiving walls 68 are provided in the first placement portion 56 (rear end portions of the side surface portions 61). The length of the locking receiving walls 68 in the up-down direction is larger than the length of the side surface portions 61 of the main body placement portion 57 in the up-down direction. As shown in FIG. 9, an inclined surface 69 is formed at an inner edge (edge on the central side in the left-right direction) of an upper end surface of each of the left and right locking receiving walls 68. The left and right inclined surfaces 69 are gradually inclined downward toward the inner side. The inclined surfaces 69 guide the insulator 80 to a space between the left and right side surface portions 61 of the first placement portion 56. As shown in FIG. 6, the locking receiving portions 67 are holes that penetrate the respective locking receiving walls 68 in the left-right direction. The locking receiving portions 67 have a rectangular shape elongated in the front-rear direction.

Figure 11:
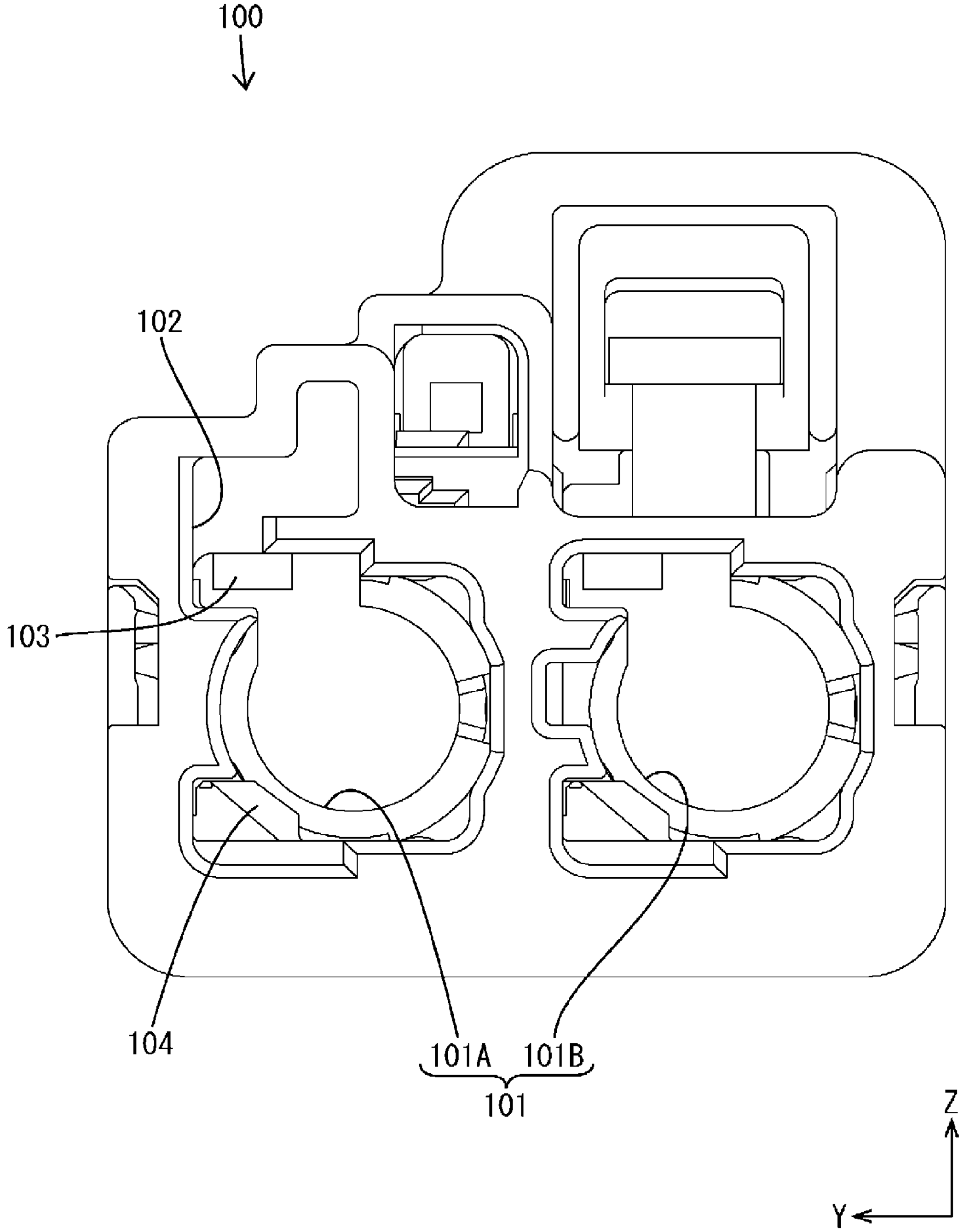
FIG. 11 is a rear view showing the housing.

The side surface portions 61 have an incorrect-insertion preventing stabilizer (referred to as "stabilizer 71") for preventing an incorrect insertion of the shielded terminal T into the housing 100. As shown in FIG. 9, the stabilizer 71 extends outward from the side surface portion 61. As shown in FIG. 11, the stabilizer 71 is inserted into a proper terminal accommodation chamber 101 (referred to as "first terminal accommodation chamber 101A"), but not into an incorrect terminal accommodation chamber 101 (referred to as "second terminal accommodation chamber 101B").

As shown in FIG. 9, the stabilizer 71 is provided on the right side surface portion 61. The stabilizer 71 is at right angles to the side surface portion 61. The stabilizer 71 protrudes rightward from the upper end of the locking receiving wall 68. As shown in FIG. 6, the stabilizer 71 is connected to a front end portion of the locking receiving wall 68. The stabilizer 71 is located forward of a front end of the locking receiving portion 67. As shown in FIG. 4, the length of the stabilizer 71 in the left-right direction (length from the side surface portion 61 in the protruding direction) is larger than that in the front-rear direction. As shown in FIG. 6, a recess 72 that is open upward is formed between the stabilizer 71 and the first stabilizer 65. The length L1 of the recess 72 in the front-rear direction is larger than the length L2 of the lance 103 in the front-rear direction (see FIG. 8).

Figure 10:
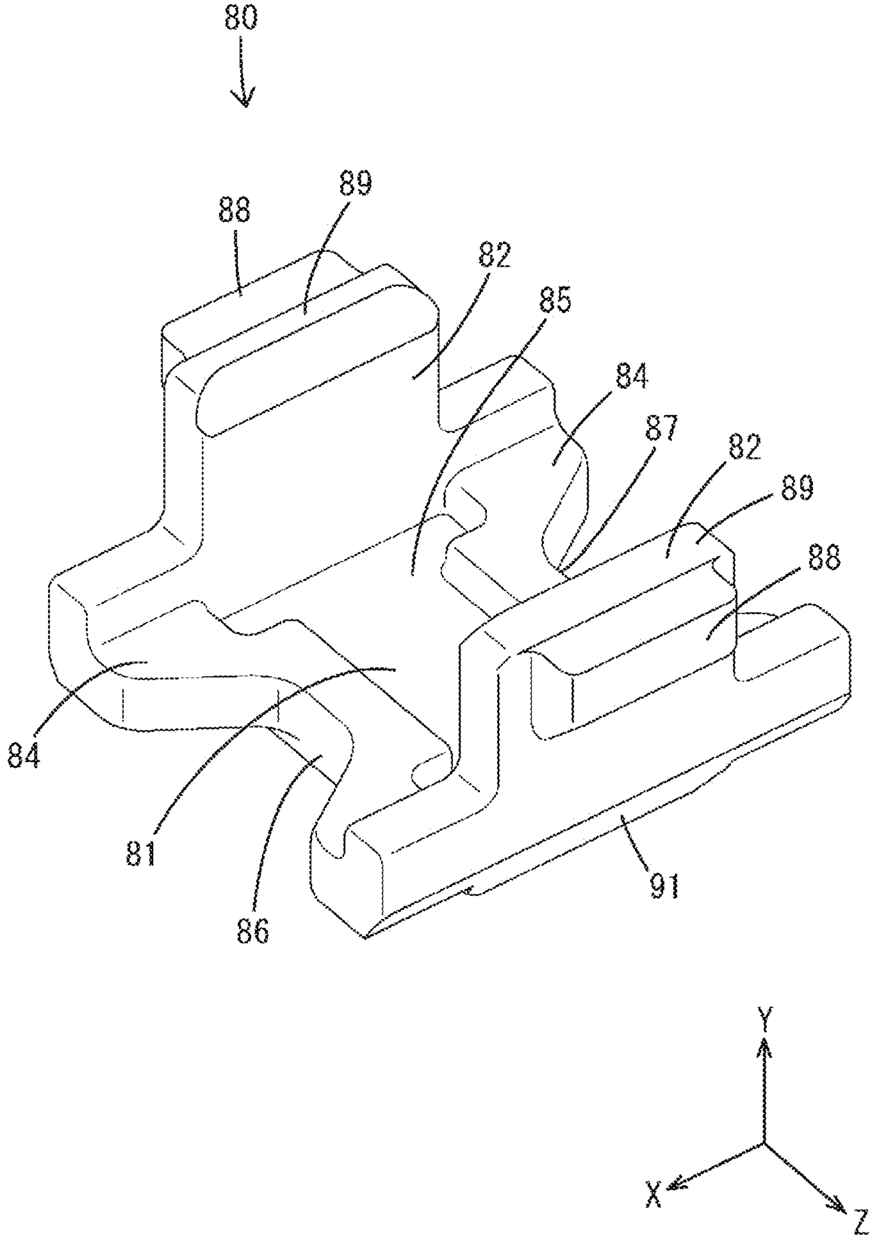
FIG. 10 is a perspective view showing the insulator.

The insulator 80 is installed in the first placement portion 56 of the electric component placement portion 52 of the outer conductor 50. The insulator 80 is made of a synthetic resin. As shown in FIG. 10, the insulator 80 has a bottom wall 81 and a pair of left and right side walls 82. The insulator 80 is shaped such that it can also be installed back to front in the outer conductor 50.

As shown in FIG. 3, the bottom wall 81 has a fitting portion 83 that fits into the first opening 62. The fitting portion 83 is provided at a central portion of the bottom wall 81 in the front-rear direction. The fitting portion 83 protrudes slightly downward from a lower surface of the bottom wall 81. In a state in which the fitting portion 83 is fitted in the first opening 62, the bottom wall 81 closes the entire first opening 62. In a state in which the fitting portion 83 is fitted in the first opening 62, a lower surface of the fitting portion 83 is located above a lower surface of the bottom surface portion 59 of the outer conductor 50.

A depressed portion 85 that is depressed downward is provided in an upper surface of the bottom wall 81. The depressed portion 85 is formed on the upper side of the fitting portion 83.

As shown in FIG. 3, the bottom wall 81 has mounting portions 84 that are mounted on a circumferential edge portion of the first opening 62. The mounting portion 84 is provided at both upper and rear end portions of the bottom wall 81.

As shown in FIG. 10, a front surface recess 86 that is recessed rearward is formed in a front surface of the bottom wall 81. A rear surface recess 87 that is recessed forward is provided in rear surface of the bottom wall 81. The front surface recess 86 and the rear surface recess 87 are provided at a central portion of the bottom wall 81 in the left-right direction. The front surface recess 86 and the rear surface recess 87 each divide the corresponding mounting portion 84 into left and right sections.

As shown in FIG. 9, guide surfaces 91 that are gradually inclined downward toward the inner side are formed at both left and right edge portions of the lower surface of the bottom wall 81.

As shown in FIG. 10, the side walls 82 protrude upward from both left and right edges of the bottom wall 81. As shown in FIG. 9, the side walls 82 are located between the first connection portion 41 and the respective side surface portions 61. The side walls 82 stand parallel to the side surface portions 61. Upper ends of the side walls 82 are located below the upper ends of the side surface portions 61.

As shown in FIG. 9, the insulator 80 has locking portions 88 that are locked to the respective side surface portions 61. The locking portions 88 are provided on locking walls 89 that are provided in the respective side walls 82. As shown in FIG. 10, the locking walls 89 are located at a central portion of the insulator 80 in the front-rear direction. The length of the locking walls 89 in the front-rear direction is smaller than the length of lower end portions of the side surface portions 61 in the front-rear direction.

The locking portions 88 are provided at upper end portions of the respective locking walls 89. The locking portions 88 are projections that protrude outward (leftward in the case of the left locking portion 88 and rightward in the case of the right locking portion 88) from the respective locking walls 89. When the locking portions 88 are viewed in the left-right direction, the locking portions 88 have a rectangular shape that is longer in the front-rear direction. The insulator 80 is prevented from detaching upward by upper surfaces of the locking portions 88 being locked to upper surfaces of the respective locking receiving portions 67.

As shown in FIG. 9, the first connection portion 41 is disposed directly above the depressed portion 85. The first connection portion 41 is located spaced apart upward from an upper surface of the depressed portion 85. The distance between the upper surface of the depressed portion 85 and the first connection portion 41 in the up-down direction is larger than the distance between an upper surface of each mounting portion 84 and the first connection portion 41 in the up-down direction. The first connection portion 41 is located spaced apart inward (leftward of the right side surface portion 61 and rightward of the left side surface portion 61) from inner surfaces of the side surface portions 61.

The housing 100 is made of a synthetic resin. As shown in FIG. 11, the housing 100 has the two terminal accommodation chambers 101. One of the two terminal accommodation chambers 101 is the first terminal accommodation chamber 101A into which the shielded terminal T with the electric component is to be accommodated. The other of the two terminal accommodation chambers 101 is the second terminal accommodation chamber 101B into which a shielded terminal (not shown) without the electric component 20 is to be accommodated.

The first terminal accommodation chamber 101A is provided with a groove 102 into which the stabilizer 71 can be inserted. The groove 102 is in communication with the inside of the first terminal accommodation chamber 101A. The groove 102 is open to a rear surface of the housing 100. The groove 102 is not provided in the second terminal accommodation chamber 101B. Therefore, when an attempt is made to insert the shielded terminal T into the second terminal accommodation chamber 101B, the stabilizer 71 abuts on the rear surface of the housing 100. This prevents an incorrect insertion of the shielded terminal T into the second terminal accommodation chamber 101B.

As shown in FIG. 8, the first terminal accommodation chamber 101A is provided with the lance 103 that is locked to the shielded terminal T. The lance 103 is cantilevered and extends forward in the first terminal accommodation chamber 101A. A front surface of the lance 103 is locked to a rear surface of the first stabilizer 65.

The housing 100 includes the retainer 104. The retainer 104 is attached to an intermediate portion of the housing 100 in the front-rear direction. The retainer 104 is locked to a rear surface of the second stabilizer 66. The shielded terminal T is prevented from coming loose from the housing 100 by the lance 103 and the retainer 104 being locked to the shielded terminal T.

Next, an example of the operation for assembling the shielded terminal T will be described.

First, the electric component 20 is connected to the center conductor 11 of the shielded wire 10. Specifically, the center conductor 11 of the shielded wire 10 and the center conductor connection portion 23 of the electric component 20 are crimped together using the crimping member 43 and thereby connected to each other.

Then, the insulator 80 is installed in the shielded terminal T. The insulator 80 is fitted into the first placement portion 56 of the outer conductor 50 from above. As a result of the locking portions 88 of the insulator 80 coming into contact with the inner side of the respective locking receiving walls 68, the locking receiving walls 68 open to the left and right and are deformed. Ultimately, the fitting portion 83 of the insulator 80 fits into the first opening 62, and the mounting portions 84 are mounted on the upper surface of the bottom surface portion 59. Also, the locking receiving walls 68 elastically return to their original positions, and the locking portions 88 are locked to the respective locking receiving portions 67. Thus, the insulator 80 is installed in the outer conductor 50. The position of the insulator 80 that has been installed in the outer conductor 50 is fixed with respect to the front-rear direction, the left-right direction, and the up-down direction.

Next, the electric component 20 connected to the shielded wire 10 is placed in the outer conductor 50. Specifically, the electric component 20 is set in the electric component placement portion 52 of the outer conductor 50 from above. As shown in FIG. 9, the first connection portion 41 is placed on the upper side the bottom wall 81 of the insulator 80. The first connection portion 41 is located spaced apart from the insulator 80. The distance between an outer circumferential surface of the first connection portion 41 and the upper surface of the depressed portion 85 of the bottom wall 81 in the up-down direction is equal to the distance between the outer circumferential surface of the first connection portion 41 and the inner surface of each side wall 82 in the left-right direction. The component main body 21 is placed on the upper side the bottom surface portion 59 of the main body placement portion 57. The second connection portion 42 is placed on the upper side the electric component connection portion 33 of the inner conductor 30. The shielding layer 13 of the shielded wire 10 is placed between the two wire barrel pieces 54, and the sheath 14 of the shielded wire 10 is placed between the two insulation barrel pieces 55.

Next, the inner conductor 30 and the electric component 20 are connected to each other. Specifically, a crimper, which is not shown, is placed above the electric component connection portion 33, and an anvil is placed below the electric component connection portion 33. The anvil is applied to a lower surface portion of the electric component connection portion 33 through the second opening 63 of the outer conductor 50. The crimping pieces 34 of the inner conductor 30 are deformed by relatively moving the crimper and the anvil toward each other. The crimping pieces 34 are wrapped around and crimped onto the outer circumference of the inner conductor connection portion 22.

Next, a corresponding crimping die is applied to the crimping portion 53 of the outer conductor 50, and the two wire barrel pieces 54 are crimped onto the shielding layer 13 of the shielded wire 10, and the two insulation barrel pieces 55 are crimped onto the sheath 14 of the shielded wire 10. Since the first opening 62 is formed forward of the crimping portion 53, the wire barrel pieces 54 and the insulation barrel pieces 55 are easy to deform. Therefore, the wire barrel pieces 54 and the insulation barrel pieces 55 are firmly crimped onto the shielding layer 13 and the sheath 14, respectively. Note that the insulator 80 is made of a synthetic resin, and therefore does not obstruct the deformation of the crimping portion 53 even when the fitting portion 83 is fitted in the first opening 62.

After that, a cover member, which is not shown, is attached to the shielded terminal T, the cover member covering an opening portion of the electric component placement portion 52. The cover member is connected to the outer conductor 50 and has a shielding function.

Next, the effects of the embodiment that is configured as described above will be described.

The shielded terminal T includes the outer conductor 50, the first and second connection portions 41 and 42, and the insulator 80. The outer conductor 50 has the crimping portion 53, the bottom surface portion 59, and the side surface portions 61. The crimping portion 53 is crimped onto the end portion of the shielded wire 10. In the bottom surface portion 59, the first opening 62 is formed forward of the crimping portion 53. The side surface portions 61 are provided on both the left and right sides of the bottom surface portion 59. The first connection portion 41 is disposed between the left and right side surface portions 61. The first connection portion 41 is formed by connecting the center conductor 11 of the shielded wire 10 and the electric component 20 to each other. The insulator 80 has the left and right side walls 82 that are located between the first connection portion 41 and the respective side surface portions 61. With this configuration, the first connection portion 41 and the outer conductor 50 are insulated from each other by the insulator 80, and thus, a short circuit between the first connection portion 41 and the outer conductor 50 can be prevented. Furthermore, since the first opening 62 is formed forward of the crimping portion 53, the crimping portion 53 is easy to deform. Accordingly, the crimping portion 53 of the outer conductor 50 can be firmly crimped onto the end portion of the shielded wire 10.

The insulator 80 has the bottom wall 81 that fits into the first opening 62. Here, there is a problem in that, when the bottom wall 81 of the outer conductor 50 has an opening, the characteristic impedance is high. However, since the first opening 62 is closed by the bottom wall 81 of the insulator 80, the characteristic impedance of the entire shielded terminal T can be improved.

The side walls 82 have the locking portions 88 that are locked to the respective side surface portions 61. With this configuration, the insulator 80 can be easily installed in its placement portion by the side walls 82 of the insulator 80 being locked to the respective side surface portions 61.

The outer conductor 50 has the tube portion 51 located forward of the bottom surface portion 59. The shielded terminal T includes the inner conductor 30 and the second connection portions 42. The inner conductor 30 is accommodated in the tube portion 51 via the dielectric 35. The second connection portion 42 is disposed between the left and right side surface portions 61. The second connection portion 42 is formed by connecting the inner conductor 30 and the electric component 20 to each other. The second opening 63 is formed at a position corresponding to the second connection portion 42 in the bottom surface portion 59. With this configuration, in a state in which the inner conductor 30 is set in the outer conductor 50, a tool for connecting the electric component connection portion 33 of the inner conductor 30 and the inner conductor connection portion 22 of the electric component 20 can be inserted into the second opening 63, and the inner conductor 30 and the electric component 20 can be easily connected to each other.

Other Embodiments of Disclosure

The embodiment disclosed herein should be considered to be illustrative in all respects and not restrictive.

(1) In the case of the foregoing embodiment, the electric component 20 is a leaded capacitor. However, in other embodiments, the electric component may be a leaded resistor, a leaded diode, or the like.

(2) In the case of the foregoing embodiment, crimping is used to connect the center conductor connection portion 23 of the electric component 20 and the center conductor 11 of the shielded wire 10 to each other, and to connect the inner conductor connection portion 22 of the electric component 20 and the electric component connection portion 33 of the inner conductor 30 to each other. However, in other embodiments, the connecting method is not limited to crimping, and soldering, resistance welding, ultrasonic welding, or the like may be used.

(3) In the case of the foregoing embodiment, the insulator 80 has the fitting portion 83 that fits into the first opening 62. However, in other embodiments, a configuration may be adopted in which the insulator does not have a fitting portion and simply closes the first opening by being mounted on the bottom surface portion of the outer conductor.

(4) In the case of the foregoing embodiment, the locking portions 88 of the insulator 80 are locked to the respective locking receiving portions 67 of the outer conductor 50. However, the locking structure between the insulator and the outer conductor may be changed as appropriate.

LIST OF REFERENCE NUMERALS

C Shielded connector
T Shielded terminal
10 Shielded wire
11 Center conductor
12 Coating
13 Shielding layer
14 Sheath
20 Electric component
21 Component main body
22 Inner conductor connection portion
23 Center conductor connection portion
30 Inner conductor
31 Mating terminal connection portion
32 Locking projection
33 Electric component connection portion
34 Crimping piece
35 Dielectric
41 First connection portion
42 Second connection portion
43 Crimping member
50 Outer conductor
51 Tube portion
52 Electric component placement portion
53 Crimping portion
54 Wire barrel piece
55 Insulation barrel piece
56 First placement portion
57 Main body placement portion
58 Second placement portion
59 Bottom surface portion
61 Side surface portion
62 First opening
63 Second opening
64 Connecting portion
65 First stabilizer
66 Second stabilizer
67 Locking receiving portion
68 Locking receiving wall
69 Inclined surface
71 Stabilizer
72 Recess
80 Insulator
81 Bottom wall
82 Side wall
83 Fitting portion
84 Mounting portion
85 Depressed portion
86 Front surface recess
87 Rear surface recess
88 Locking portion
89 Locking wall
91 Guide surface
100 Housing
101 Terminal accommodation chamber
101A First terminal accommodation chamber
101B Second terminal accommodation chamber
102 Groove
103 Lance
104 Retainer

What is claimed is:

1. A shielded terminal comprising:
an outer conductor;
an inner conductor accommodated in the outer conductor via a dielectric;
a connection portion for an electric component; and
an insulator,
wherein the outer conductor has a crimping portion that is crimped onto an end portion of a shielded wire, a bottom surface portion in which a first opening is formed forward of the crimping portion, and side surface portions provided on both left and right sides of the bottom surface portion,
the connection portion for the electric component includes a first connection portion disposed between the left and right side surface portions and formed by connecting a center conductor of the shielded wire and the electric component to each other, and a second connection portion disposed between the left and right side surface portions and formed by connecting the inner conductor and the electric component to each other,
the insulator has left and right side walls that are located between the first connection portion for the electric component and the respective side surface portions, and
a second opening is formed at a position corresponding to the second connection portion in the bottom surface portion.

2. The shielded terminal according to claim 1,
wherein the insulator has a bottom wall that fits into the first opening.

3. The shielded terminal according to claim 1,
wherein the side walls have locking portions that are locked to the respective side surface portions.

4. The shielded terminal according to claim 1, wherein the outer conductor has a tube portion located forward of the bottom surface portion, and the inner conductor is accommodated in the tube portion via the dielectric.

5. A shielded connector comprising:

the shielded terminal according to claim 1; and a housing having a terminal accommodation chamber in which the shielded terminal is accommodated.

* * * * *